United States Patent [19]

Saliaris

[11] Patent Number: 4,763,438
[45] Date of Patent: Aug. 16, 1988

[54] PORTABLE LIVE BAIT CONTAINER

[76] Inventor: George P. Saliaris, 1847 Arlington Ave., Columbus, Ohio 43212

[21] Appl. No.: 944,767

[22] Filed: Dec. 22, 1986

[51] Int. Cl.$^4$ .............................. A01K 97/04
[52] U.S. Cl. .............................................. 43/56
[58] Field of Search .............................. 43/55, 56, 57

[56] References Cited

U.S. PATENT DOCUMENTS

| | | | |
|---|---|---|---|
| 2,538,462 | 1/1951 | Klatt | 43/56 |
| 2,683,950 | 7/1954 | Gellenbeck | 43/56 |
| 2,767,509 | 10/1956 | Breithaupt | 43/57 |
| 2,785,502 | 3/1957 | Sandness | 43/57 |
| 3,344,552 | 10/1967 | Glasco . | |

Primary Examiner—Gene P. Crosby
Attorney, Agent, or Firm—Francis T. Kremblas, Jr.

[57] ABSTRACT

A portable live bait container for use by anglers to transport and facilitate use of live bait such as minnows or shrimp or the like. The container includes an outer impervious enclosure provided with a supporting carrying handle and an open top and an inner shell of similar configuration which is slideably and removably mounted through the open top into the outer enclosure. The inner shell is provided with a handle support for vertically raising the inner shell out of the outer shell and includes side walls which are impervious to water and a bottom wall which is provided with openings for the ingress or egress of water. In addition, the bottom wall is provided with a centrally disposed bowl-like portion tending to entrap live bait and a small amount of water therein when the inner portion is raised above the surrounding water level.

3 Claims, 2 Drawing Sheets

PORTABLE LIVE BAIT CONTAINER

BACKGROUND

Portable containers used by fishermen to transport live bait for use while fishing have been available for many decades. Generally, minnows, live shrimp and similar baits are most desirable when kept in a lively condition over the extended period of time while the angler is fishing.

For this type of live bait, a supply of water is necessary in order to maintain the bait in a live, fresh condition for any reasonable length of time. Containers used for this purpose have ranged from a simple single impervious container or bucket to the traditional and commonly referred to double shell "minnow bucket". The common "minnow bucket" consists of an impervious outer shell and an inner shell of slightly smaller size removably mounted or nested in the outer shell container. The inner shell typically included side walls and a bottom wall. The side walls are provided with a plurality of round perforations to permit the inlet and outlet of water from the inner shell. This very old and well-known, double shell container facilitated the chore of capturing one of the bait specimens in the container via merely lifting of the perforated inner shell from the outer shell which permitted water to drain through the perforations. Additionally, this double shell type construction permitted the user to replenish the container with fresh water to better maintain the bait in a lively condition without risking loss of the bait or use the inner shell, removed from the outer shell, immersed in the body of water in which the angler is fishing.

However, no improvements to this prior art construction have been made over this very long time of use in spite of a long and well-known problem associated with its use. Due to the location of the perforations in the side walls of the inner shell, when the inner shell is lifted upwardly to permit the water to drain therefrom, water escaping from the inner shell tends to spurt horizontally outwardly from the sides of the inner shell. Often it is spilled upon the user holding the inner shell as well as onto the floor of the boat or platform upon which the angler is fishing. Unless significant care is exercised, the amount of water spilled in this manner not only contributed to the user and/or the floor of the boat becoming inordinately messy and wet, it also significantly reduces the amount of water remaining in the outer shell. Therefore when used in the nested configuration as previously described, the user must make the additional effort to periodically refill the water content available in the outer shell much more frequently than otherwise necessary. Without much greater care than most anglers desire to exercise, use of this prior art type of container represented a significant nuisance which detracted from the clear advantages which it offered relative to keeping bait lively and catching bait for use.

Prior to the present invention, a satisfactory solution to these nuisance factors associated with the prior art double shell container which also preserved the well-recognized advantages has not been forthcoming from those skilled in the art.

SUMMARY OF INVENTION

The present invention relates generally to a portable live bait container for use by fisherman to transport live bait for angling purposes and particularly to an improved double shell type construction for such a live bait container. The construction of the bait container of the present invention provides the advantages of the prior art type of containers and eliminates significant disadvantages associated with the use of such double shell containters.

In accordance with the present invention, the inner shell portion which is removably disposed within the outer portion, includes a novel feature wherein the water inlet and outlet aperatures are provided in the bottom wall. This permits the water to drain directly downward through the aperatures in the bottom wall instead of spurting outwardly horizontally from the side walls.

Further, the bottom wall is provided with a centrally disposed downwardly depending or recessed trap portion which tends to accumulate the live bait therein with a small amount of water upon draining of the inner shell to facilitate the catching and retrieval of a bait specimen by the user.

This construction greatly facilitates the manipulation of the inner shell to drain the water content and retrieve a live bait specimen without any significant spillage of water outside the confines of the outer shell when used in conjunction therewith. For those instances when the inner shell is removed from the outer shell and hung directly into the body of water in which one is fishing, it may be raised therefrom in a manner which much more easily tends to eliminate any excessive spillage of water onto the user or into the boat.

Therefore the construction of the present invention greatly reduces, if not wholly eliminates, any significant water spillage upon the user or in the boat or on the fishing platform during the normal use thereof while retaining the advantages associated with the use of double shell containers.

As another aspect of the present invention, the construction of the inner and outer shell lends itself to relatively inexpensive manufacture from molded plastic components to provide an attractive and sturdy construction.

As a further aspect of the present invention, the bowl-like recess provided in the bottom wall below the level of the aperatures, facilitates the capture of a bait specimen by tending to accumulate the bait specimen in a significantly reduced area than comparable prior art constructions having the same or a similar capacity.

DETAILED DESCRIPTION

Figure 1:
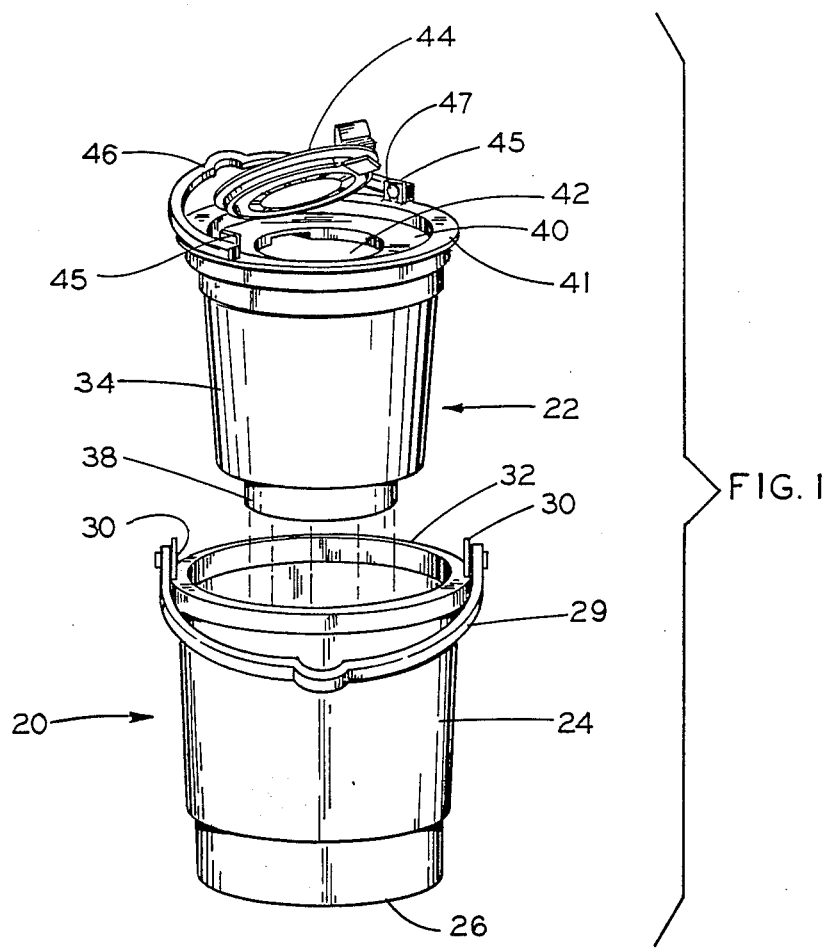
FIG. 1 is a perspective view of a live bait container constructed in accordance with the present invention illustrating the inner and outer shell portions in exploded relationship relative to their nested configuration.

An improved live bait container constructed in accordance with the present invention is shown in FIG. 1 and includes an outer shell portion, indicated generally at 20, and an inner shell portion, indicated generally at 22.

Outer shell 20 comprises a conventional generally cylindrical bucket or open top container having solid side walls 24 and bottom walls 26 which are made of a material impervious to water. A handle is provided which is connected to shell 24 via a pair of aperatured tabs 30 which are extended through a slot provided in a surrounding lip portion 32. Each end of handle 28 is provided with a post pivotally received within the aperature of a respective tab 30 to retain the handle assembly in a fixed position to permit manually carrying shell 24.

Inner shell portion 22 comprises a container means having a complementary shape relative to outer shell 24. Shell 22 includes generally cylindrical side walls 34, an aperatured bottom wall portion 36, and a recessed bottom wall portion forming a bowl-like trap 28 and a top wall 40.

An opening 42 in top wall 40 is opened or closed via a pivoted lid 44. The detailed construction of top wall 40 and lid 44 and a handle means 46 will be described later herein.

The generaly dimensions of the side wall configuration of inner shell 22 are preferably slightly smaller than side walls 24 of outer shell 20 to permit inner shell 22 to freely nest within outer shell 20 without interference and yet utilizes most of the volume of the outer shell 20 to maximize the bait carrying capacity relative to the overall size of the combined assembly.

Preferably, the outer and inner shells 20 and 22 and the other components are made of a conventional plastic material which can be readily injection molded. However, the primary features of the present invention are not dependent upon the type of material or the method of fabrication and could be incorporated using other suitable materials.

Figure 2:
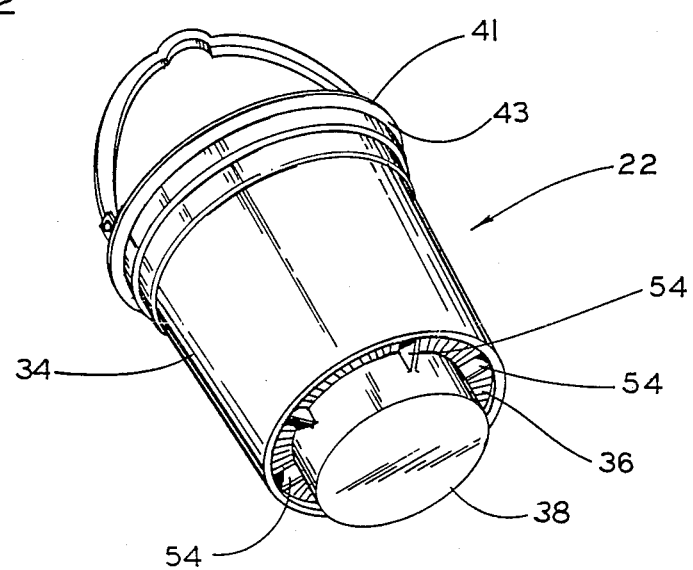
FIG. 2 is a perspective view of the inner shell portion of the present invention shown in FIG. 1 with the inner shell disposed to illustrate the novel bottom wall construction.
Figure 3:
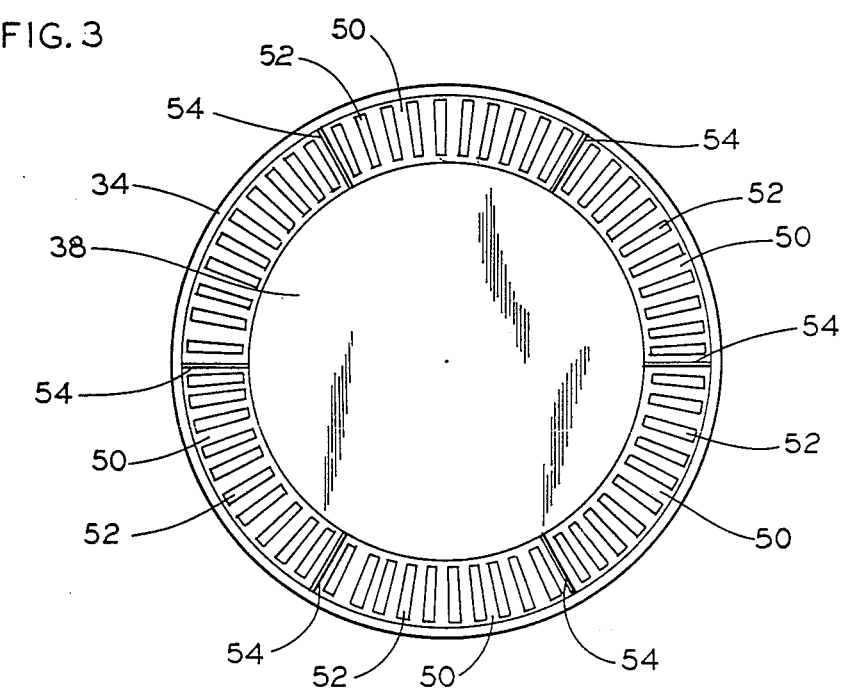
FIG. 3 is a bottom plan view of the inner shell portion of the present invention shown in the preceding Figures.

As best seen in FIGS. 2 and 3, the aperatured bottom wall portion 26 comprises a plurality of slots, such as at 50, forming openings for the relatively rapid inlet and outlet of water. These slots 50 are formed between a plurality of ribs 52 which are integrally formed with and connect the lower portion of side walls 34 with the top of a recessed bowl-like trap portion 38. A plurality of reinforcing ribs 54 are provided to increase the structural support of trap portion 38. Bowl-like trap portion 38 has a generally cylindrical configuration with solid side and bottom walls and an open top communicating with the interior of inner shell 24.

The size of the slots or aperatures 50 are designed relative to the size of the typical live bait kept in the container such that the bait specimen cannot escape through one of the slots 50. Preferably, slots 50 are as large as reasonably possible to maintain the bait in the shell 22 while permitting water to enter and exit through the slots in a reasonably rapid manner. The relatively large number of slots extending around the perimeter of the interior of shell 22 further enhances the rapid ingress and egress of water. Since trap portion 38 extends below the plane of the aperatured portion 36, sufficient clearance between the bottom wall 26 and slots 50 is provided to permit water present in outer shell 20 to rapidly enter inner shell 22 when inner shell 22 is placed in a nested position within outer shell 20.

It should also be noted that as water rapidly exits the inner shell 22, the bait specimens will tend to be congregated within the relatively smaller volume of water retained in the significantly reduced area represented by trap portion 38 to facilitate the catching of the specimen by the user.

Figure 4:
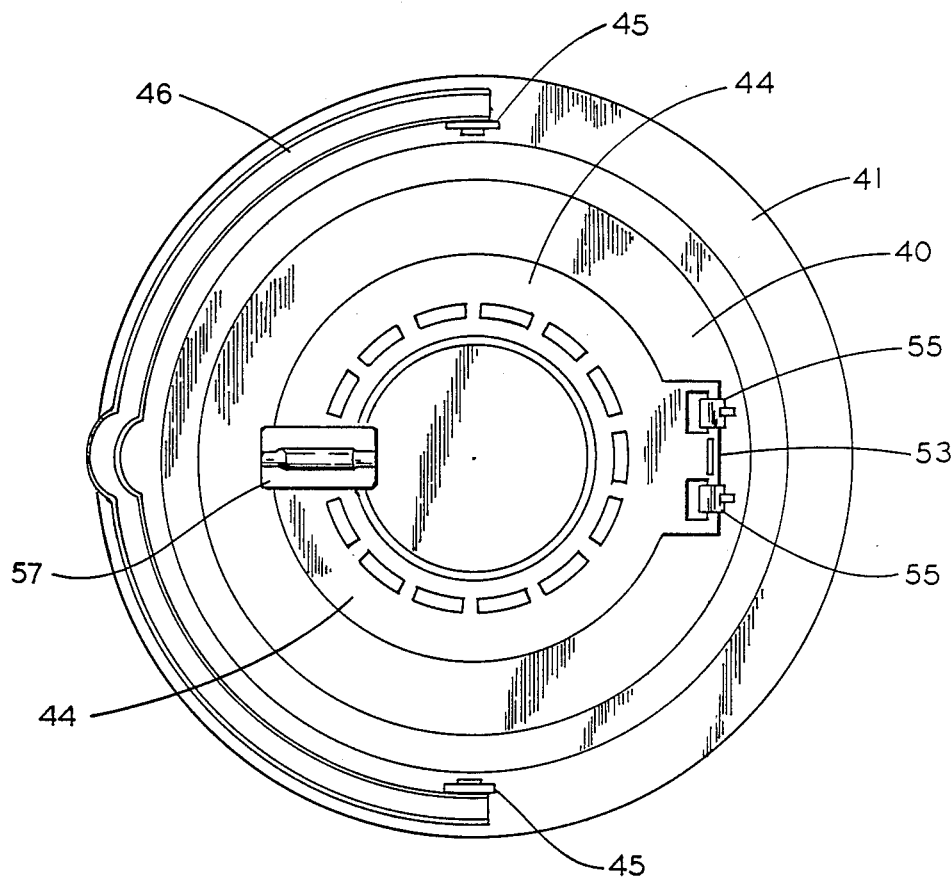
FIG. 4 is a top plan view of the inner shell portion of the present invention shown in the preceding Figures.

With reference to FIGS. 1 and 4, in the preferred embodiments shown, top wall 40 of inner shell 22 is fabricated as a separate component and includes a slightly raised, integrally formed outer lip 41. The remaining structure of shell 22 comprises an integrally formed component which includes an outwardly extending annular lip or flange 43 formed on the uppermost portion of side walls 34. Lip 41 overlies flange 43 when top wall 40 is positioned in its assembled relationship with the remainder of shell 22.

The lip or flange portions 41 and 43 are secured to one another via aligned slots formed in each lip 41 and 43 through which a tab member 45 is inserted similar to the tab 30 described earlier herein regarding outer shell 20 and handle 28. Tab member 45 has an upper portion adapted to extend upwardly the aligned slots in lips 41 and 43 and a lower portion which is too large to pass through the slots to limit the upward extension of the upper portion above lip 41. An opening 47 provided in the upper portion of tab 45 is adapted to pivotally receive an inwardly extending pin or post member 49 integrally formed near each end of handle 46. When post member 47 is disposed in opening 47, tab 45 cannot be removed from its receiving slot such that the lip portions 41 and 43 are fastened together to maintain the assembly of top wall 40 to the remainder of inner shell 22.

Using this construction, the outer lip 41 is sized to engage the upper lip 32 of the outer shell 20 to support inner shell 22 in a stable position within outer shell tending to secure the nested relationship and eliminate side to side movement of inner shell 22 during transportation of the container.

This construction further facilitates the economic injection molding of the top wall 40 and the remainder of shell 22 as separate parts which can be assembled in an easy and economic manner.

As a separate molded component, lid 44 is pivotally attached to top wall 40 via an integrally molded pivot pin portion 53 which is adapted to be rotatably received within a pair of hinge members 55 integrally formed on top wall 40.

In the preferred embodiment shown, lid 44 includes a conventional rotatable latch 57 for releasably locking lid 44 in a closed position over opening 42 in top wall 40 and a plurality of openings 59 to communicate the interior of the container to the atmosphere.

The live bait container of the present invention is used in the same manner as the conventional prior double shell containers. That is, it may be advantageously employed to keep minnows or shrimp in a lively condition while fishing when the inner shell 22 is nested within the outer shell 20 or when the inner shell 22 is removed and placed within the body of water which is being fished by the angler. In the latter case, of course, a line is secured to the handle 46 to prevent loss of the shell 22. Similarly, it is used in the nested configuration for transporting the bait to and from fishing sites.

In either configuration of use while fishing, when the user requires a specimen of the bait, the shell 22 is lifted upwardly from the surface of the water in which it is immersed via handle 46. The level of water within shell 22 is lowered as water drains out through slots 50. The user then merely opens lid 44 to have easy access to the bait congregated in the reduced area of trap portion 38. Upon catching the desired bait specimen, shell 22 is simply returned to its immersed condition in the supply of water. Water is then free to enter inner shell 22 via slots 50 to reach its own level and the remaining bait specimens are kept more lively in this larger volume of water.

During this bait retrieving procedure, unlike the prior art bait containers, the water exits shell 22 directly through the bottom slots 50 in a rapid manner. This makes it drammatically less likely of spilling the outlet water on the angler or into the fishing boat compared to the prior art double shell container.

This is true irrespective of whether the inner shell is used when the outer shell 20 is filled with the supply of water or whether the inner shell is used separately and immersed in a larger body of water, such as alongside a boat. In either case the exit of water through the bottom wall, rather than the side walls permits the exiting water to be directed downwardly upon raising the inner shell 22 instead of spurting horizontally out of the side walls of the shell.

In view of the foregoing description, it should be readily apparent that the present invention preserves the advantages of the prior art bait containers, yet eliminates the disadvantages and nuisance associated with their use in a simple and economic manner.

What is claimed is:

1. An improved portable live bait container of the type having an outer shell provided with bottom and side walls impervious to liquid and an inner shell vertically and removably nested within said outer shell and including aperatures to permit the ingress and egress of water from said inner shell to facilitate access and removal of said live bait from said container, the improvement comprising, in combination, said inner shell having side walls impervious to liquid and aperatures formed in at least a portion of a bottom wall for the ingress and egress of liquid present in said container directly from said bottom wall, said bottom wall including a bowl-shaped centrally disposed recess impervious to liquid and extending below the vertical plane of the bottom wall portion provided with said aperatures.

2. The container defined in claim 1 wherein said aperatures are formed between a plurality of radially extending ribs interconnecting the side walls and said centrally disposed bowl-shaped recess.

3. The container defined in claim 1 wherein a top edge of said side walls of said outer shell include a first outwardly extending annular lip and the top wall of said inner shell includes a second outwardly extending annular lip which engages and overlies said first lip when said inner shell is fully disposed within said outer shell to stabilize said shells in said nested relationship.

* * * * *